Jan. 2, 1940. C. KIMMEL 2,185,409
RAKING AND LIFTING ATTACHMENT FOR A TRACTOR
Filed May 20, 1938 2 Sheets-Sheet 1
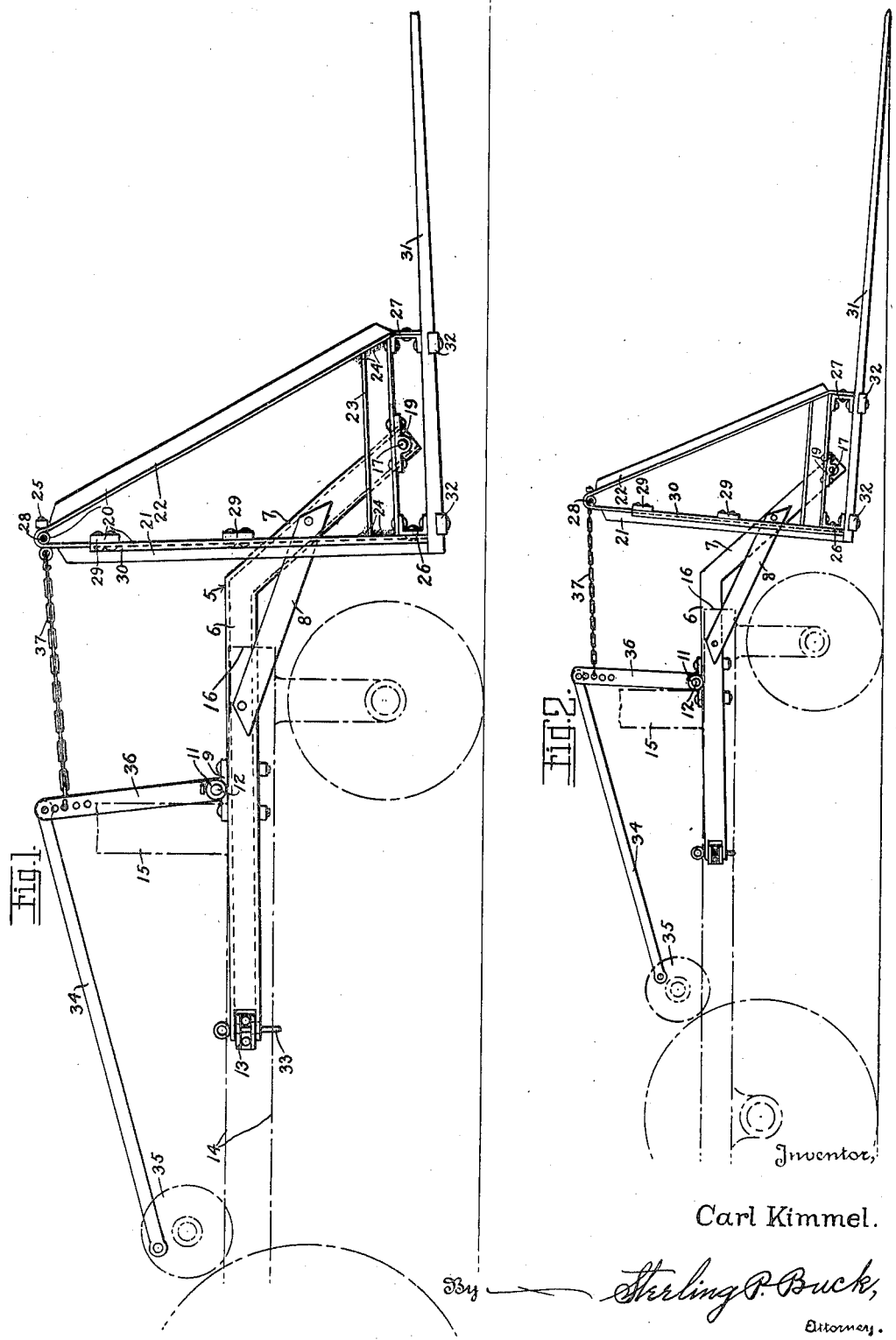
Inventor,
Carl Kimmel.
By Sterling P. Buck,
Attorney.

Jan. 2, 1940.   C. KIMMEL   2,185,409
RAKING AND LIFTING ATTACHMENT FOR A TRACTOR
Filed May 20, 1938   2 Sheets-Sheet 2
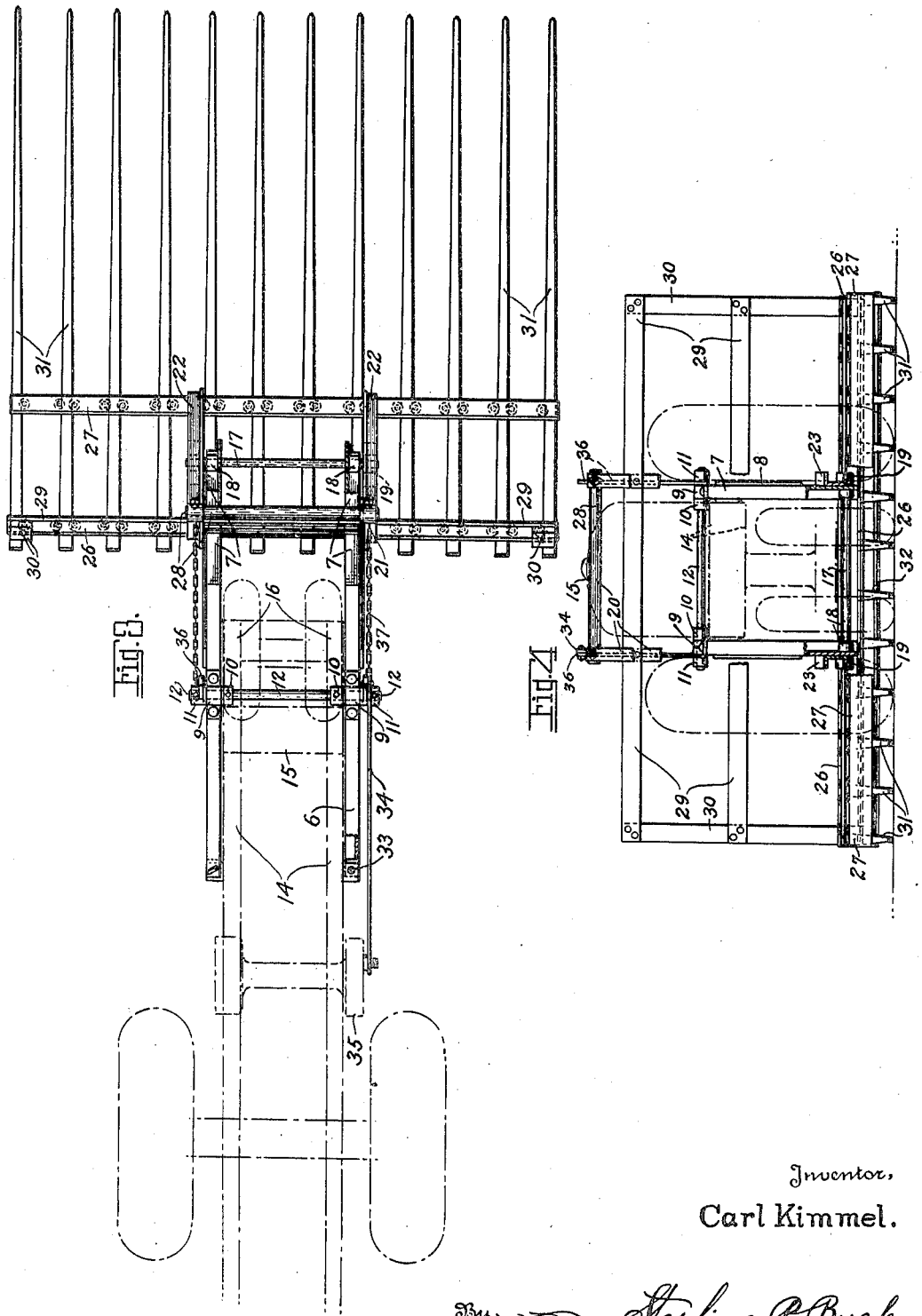
Inventor,
Carl Kimmel.
By 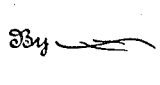
Attorney.

Patented Jan. 2, 1940

2,185,409

UNITED STATES PATENT OFFICE 2,185,409

RAKING AND LIFTING ATTACHMENT FOR A TRACTOR

Carl Kimmel, Rockford, Ohio

Application May 20, 1938, Serial No. 209,115

6 Claims. (Cl. 56—27)

This invention relates to harvesting rakes of the type known as "sweep-rakes" or "buck-rakes", and more specifically, to what I choose to call a raking and lifting attachment for a tractor.

The primary object of the invention is to provide a thoroughly practical device which can be very quickly and easily attached to a tractor of the Allis-Chalmers type and thereby be operated for raking mown or reaped crops, lifting such crops from the ground, and conveying the crops to places where they are to be housed or stacked or threshed or baled, as occasion may require.

A further object is to attach the raking and lifting device to the tractor in such relation that the front and greater portion of it is free for upward movement with respect to the tractor so it will not be detrimentally affected by the dropping of the tractor's front wheels into a depression; but having its other movements, or tendencies to move, restrained and controlled by the manner of its engagement with the tractor.

Another object is to so nearly balance the rake-carrying frame on the tractor attaching frame that the tendency of the rake-teeth to dig into the ground is minimized, and that the required power to lift the load on the rake is also minimized.

Other objects and important features are pointed out or implied in the following details of description, in connection with the accompanying drawings in which:

Fig. 1 is a right-side view of my invention in the load-carrying position on a tractor of the Allis-Chalmers type, the front ends of the rake-teeth being broken off.

Fig. 2 is a reduced size view of the same side as seen in Fig. 1, but the rake-teeth being in the lowered position for raking and raising the load.

Fig. 3 is a top plan view, parts being broken away, and parts in section.

Fig. 4 is a front elevation, parts being broken away, and parts in section.

Referring to these drawings in detail, in which, the chassis, wheels and radiator of the tractor are shown in broken lines, and in which, similar reference numerals refer to similar parts throughout the several views, the invention is described in detail as follows:

A tractor-attaching and rake-supporting frame 5 is composed of two approximately horizontal beams 6, two downwardly and forwardly inclined beams or extensions 7 of the beams 6, two braces or struts 8, two bearings 9, two collars 10, two other collars 11, and a supporting member or rock-shaft 12 which extends through the bearings and the four collars and is secured to the latter, by any appropriate means, so as to hold the beams in a definitely spaced relation in agreement with the space between two apertured attaching brackets 13 that are fixed on the respective opposite sides of the chassis 14 on whose horizontal beams is supported the radiator 15, and whose front ends of the beams extend forwardly beyond the radiator, as indicated at 16. The frame 5 also includes a pivotal member or shaft 17, that is preferably secured at 18, to the beam-sections 7 and extend laterally therebeyond into bearings 19 and constitute pivotal means that support the rake-carrying frame 20.

The rake-carrying frame 20 is substantially upright and consists of two triangular frame-sections each comprising upright beams or beam-sections 21 and 22, and a base-beam 23, preferably welded together at 24, while the upper ends of the beam sections are preferably united by web 15 or flange portions of the metal beams that include the beam-sections 21 and 22; though, if not thus united, they are united by means of bolts 25 that extend therethrough. The triangular frame-sections of the carrying frame 20 are spaced from one another sufficiently to receive the lower-front ends of the beam-sections 7 between them and practically against them, so the beam sections 7 prevent the frame-sections from moving laterally, inasmuch as these triangular sections are secured at their lower ends to horizontal and laterally extending beams 26 and 27, and secured at their upper ends to a beam 28 by means of the bolts 25 and/or by other appropriate securing means. The triangular frame-sections are also connected by beams or strips 29 whose outer ends are secured to upright beams or strips 30. These strips 30 have their lower ends secured to the beam 26 and are supported thereby, and also help them to support the load carried on the rake which consists of a series of rake-teeth 31 that are preferably supported on strips 32, or at least on one of such strips under the beam 29 and secured to this beam by bolts, rivets or other appropriate means.

The supporting portion 9—10—12 of the supporting frame, is normally seated on the front ends 16 of the chassis-beams, immediately in front of the radiator 15 and is free to move upward in view of the loose connection of the coupling pins 33 through the bifurcated and apertured rear ends of the beam-sections 6 and the brackets 13; so, in the event the front wheels of the tractor run into a depression of the ground, or in the event of the rake being forced over a stone, stump or hump, no detriment results; and this relation of parts is helpful in attaching the raking device to the tractor; for the parts 9, 10, 11 and 12 constitute beam-spacing means to keep the beams 6 properly spaced, so that if the beams 6 are held or propped up in the proper position, the tractor can be run forward until its front end is under the supporting portion 9—10—12, and so that the brackets 13 enter the bifurcated ends of the beam-sections 6, then nothing remains to be done except to drop the coupling pins 33 into the normal position shown, and to connect the operating link 34 to the rotary power-transmission member 35 of the tractor.

In addition to the two previously mentioned functions of the supporting and spacing means 9—10—12, it combines with the collars 11 and arms 36 thereon and with the members 34, 35, 25 and 37 for tilting the upright frame 20 and rake-teeth 31 so as to raise the latter from the position shown in Figs. 2, 3 and 4 to that of Fig. 1. The apertures in the upper end of each of the arms 36 provide for different adjustments of the flexible connection or chain 37.

While rivets have been shown in some parts, and bolts shown in other parts, either may replace or be replaced by the other, or welding may replace either or both; and while the device is indicated as being constructed mainly of metal beams of angular and channeled cross-section, it is well within the scope of this invention, to construct it of material other than metal and of beams having cross sections different from those illustrated; nor is the invention limited to other precise details of construction and arrangement than those defined in the claims as follows.

I claim as my invention:

1. In a raking and lifting attachment for a tractor which includes a radiator upon a chassis that has a forwardly extending end-portion in front of the radiator, the combination of an approximately horizontal attaching and supporting frame, a substantially upright rake-carrying frame, approximately horizontal rake-teeth secured to the upright frame, and operating means to tilt the rake-carrying frame so as to raise the front ends of the rake-teeth from their raking position, said substantially upright rake-carrying frame being inclusive of two triangular frame-sections each having a base-beam disposed horizontally and provided with a bearing substantially midway between its ends and slightly above said rake-teeth, said approximately horizontal attaching and supporting frame having a downwardly and forwardly inclined front end provided with means to pivotally connect it with said bearings and thereby to support said substantially upright rake-carrying frame in proper relation to be tilted by the said operating means, said approximately horizontal supporting frame being provided with quickly attaching and detaching means for detachably connecting its rear end to said chassis at points immediately at the lateral sides of said chassis and in the rear of said radiator, and said approximately horizontal supporting frame being inclusive of a supporting structure that is approximately midway between the front end and rear end of said supporting frame and adapted to be seated on said forwardly extending end portion of the said chassis when the said rear end is engaged with its chassis-connecting means, for purposes specified.

2. The combination defined by claim 1, said supporting structure being inclusive of a rock-shaft adapted to be seated on said forwardly extending end portion of the chassis, said operating means being inclusive of an arm on said rock-shaft and of means connecting said arm to the upper portion of said upright rake-carrying frame.

3. The combination defined by claim 1, said supporting structure being inclusive of a rock-shaft, adapted to be seated on said forwardly extending portion of the chassis, said operating means being inclusive of two arms that are united with opposite ends of said rock-shaft and extending upward therefrom in the proper relation to permit them to be swung rearward beyond the front part of said radiator, and means connecting the upper end of each of said arms of the said rock-shaft to the upper end of said upright rake-carrying frame, one of said arms being provided with means for linking it to a power-transmission member of said tractor.

4. In a raking attachment for a vehicle, the combination of a ranking unit including rake-teeth, means including a pivotal shaft to connect and support said raking unit on said vehicle in such relation that the rake-teeth are substantially horizontal and near to the ground on which the vehicle stands and travels, and means on the vehicle to tilt the raking unit so as to move the rake-teeth into and out of contact with the ground; the said raking unit being inclusive of two triangular upright frames each including a horizontal base-beam provided with a pivot-bearing, two horizontal tooth-attaching beams or sub-base beams respectively under the front and rear ends of the base-beams and secured thereto for connecting and securing the base-beams together in properly spaced relation to receive and retain the end-portions of said pivotal shaft in said pivot bearings for effecting the pivotal supporting of said raking unit, said rake-teeth being secured to the under sides of the said sub-base beams, substantially as shown.

5. For cooperation with a tractor which includes a radiator and also includes a chassis whose front end extends forwardly from the radiator, a lifting attachment which includes two attaching elements with means to secure them on opposite sides of the chassis, two beams provided with loose-attaching means at their rear end portions for movably securing them to said attaching elements, beam-spacing means secured to said beams in a proper relation to keep the beams properly spaced for ready attachment to said attaching elements when the latter are secured on said opposite sides of the chassis, said beam-spacing means being adapted to be seated on said front end of the chassis in the proper relation to be freely moved upward and downward over said front end of the chassis, and means secured to front end portions of said beams for engagement with material to be lifted, all substantially as specified.

6. The combination with a tractor which includes a radiator and also includes a chassis whose front end extends forwardly from said radiator, attaching elements secured on opposite sides of said chassis, two beams having rear end portions provided with loose-attaching means which movably secure said rear end portions normally to said attaching elements, beam-spacing means secured to said beams in a proper relation to keep said beams properly spaced for ready attachment to said attaching elements, said beam-spacing means being seated normally on said front end of the chassis and disunited with the chassis so this beam-spacing means is also a beam-support and is free to be moved up and down over said front end of the chassis and thereby permit the front ends of the beams to move up and down, and means secured to the front end portions of the said beams for engagement with material to be raised, all substantially as specified.

CARL KIMMEL.